US009778491B2

(12) United States Patent
Rinella (10) Patent No.: US 9,778,491 B2
(45) Date of Patent: Oct. 3, 2017

(54) ADJUSTABLE TINT EYEWEAR USING POLARIZED FILTERS (71) Applicant: Philip S. Rinella, Lock Haven, PA (US)

(72) Inventor: Philip S. Rinella, Lock Haven, PA (US)

(*) Notice: Subject to any disclaimer, the term of this patent is extended or adjusted under 35 U.S.C. 154(b) by 39 days.

(21) Appl. No.: 14/805,582

(22) Filed: Jul. 22, 2015

(65) Prior Publication Data
US 2016/0026007 A1 Jan. 28, 2016

Related U.S. Application Data (60) Provisional application No. 62/029,385, filed on Jul. 25, 2014.

(51) Int. Cl.
G02C 7/12 (2006.01)
G02B 27/28 (2006.01)
G02C 5/00 (2006.01)

(52) U.S. Cl.
CPC ............ G02C 7/12 (2013.01); G02B 27/281 (2013.01); G02C 5/008 (2013.01); G02C 2200/16 (2013.01); G02C 2200/18 (2013.01)

(58) Field of Classification Search
CPC ...... G02C 7/12; G02C 5/008; G02C 2200/16; G02C 2200/18; G02B 27/28; G02B 27/281
USPC ........................................ 351/41, 44, 47, 49
See application file for complete search history.

(56) References Cited

U.S. PATENT DOCUMENTS

| 2,298,058 | A | | 10/1942 | Land | |
|---|---|---|---|---|---|
| 4,090,830 | A | * | 5/1978 | Laliberte | B29D 11/00634 249/84 |
| 4,149,780 | A | * | 4/1979 | Young | G02C 7/12 351/49 |
| 4,264,154 | A | * | 4/1981 | Petersen | G03B 9/32 351/49 |
| 4,386,832 | A | | 6/1983 | Nannini | |
| 4,559,556 | A | * | 12/1985 | Wilkins | H04N 13/0434 348/42 |
| 4,723,844 | A | * | 2/1988 | Medina | G02C 3/003 351/111 |
| 4,826,308 | A | * | 5/1989 | Sadun | A61B 3/024 351/232 |
| 4,943,152 | A | * | 7/1990 | Whelen | G02C 7/105 351/47 |

(Continued)

Primary Examiner — William R Alexander
(74) Attorney, Agent, or Firm — Wendy W. Koba (57) ABSTRACT Eyewear is configured to use pairs of polarized lenses, with one pair held stationary within an eyeglass frame, and the remaining pair disposed adjacent with the fixed pair and permitted to rotate under the control of the wearer. A novel mechanism is included within the eyewear for the wearer to use in rotating the movable lenses with respect to the fixed lenses. In particular, a flexible member is included to surround a majority of each rotatable lens, with the flexible member riding within a channel formed in the frame. A lever, or other type of hand control fixture, is attached to the flexible member. The wearer may than move the lever back and forth, which imparts a linear motion to the flexible member. The linear motion of the flexible member is translated into a rotational movement of the attached lenses, thus creating a wearer-adjustable tint.

17 Claims, 7 Drawing Sheets (56) References Cited

U.S. PATENT DOCUMENTS

| | | | | |
|---|---|---|---|---|
| 5,210,552 | A * | 5/1993 | Baran | G02C 7/12 |
| | | | | 351/44 |
| 5,355,183 | A | 10/1994 | Andrea | |
| 5,519,459 | A * | 5/1996 | Moglianesi | G02C 7/12 |
| | | | | 351/47 |
| 5,546,141 | A | 8/1996 | Wheatley | |
| 5,663,779 | A | 9/1997 | Karasawa | |
| 5,841,506 | A | 11/1998 | Karasawa et al. | |
| 5,914,765 | A * | 6/1999 | Wang | G02C 9/00 |
| | | | | 351/41 |
| 6,386,702 | B1 * | 5/2002 | Maloncon | G02C 7/12 |
| | | | | 351/158 |
| 7,467,865 | B2 | 12/2008 | Szejnwald | |
| 2010/0214530 | A1 * | 8/2010 | Stovall | G02C 3/003 |
| | | | | 351/156 |
| 2011/0181828 | A1 * | 7/2011 | Yi | G02C 7/08 |
| | | | | 351/47 |

\* cited by examiner

ADJUSTABLE TINT EYEWEAR USING POLARIZED FILTERS

CROSS-REFERENCE TO RELATED APPLICATIONS

This application claims the benefit of U.S. Provisional Application Ser. No. 62/029,385, filed Jul. 25, 2014 and herein incorporated by reference.

TECHNICAL FIELD

The present invention relates to tinted eyewear (such as sunglasses) and, more particularly, to eyewear having a tint that is easily adjustable by the wearer as necessary, for convenience and/or comfort.

BACKGROUND OF THE INVENTION

There are many instances where it would be convenient to adjust the tint (i.e., the "darkness") of eyewear. When driving, for example, the amount of sun glare may change on a moment's notice, particularly when changing directions. The ability for a wearer to adjust the tint of his/her sunglasses would be useful. Various other types of eyewear— traditional eye glasses, goggles, safety glasses, and the like—could benefit from this ability of allowing the wearer to adjust the tint quality.

For years, there have been sunglasses that have "self-adjusted" their degree of tint as a function of the ambient light conditions. That is, the glasses would "lighten" when an individual would go indoors, and would then darken when going back outside. While useful in many situations, various versions of these self-darkening lenses have been only moderately successful. At times, the material used to form the lenses does not allow for a sufficient lightening effect to be obtained. Moreover, it generally takes a few minutes for the lenses to change their tint. When driving, this slow reaction time is unacceptable. Additionally, the wearer cannot control the amount of tint, or the circumstances under which the lenses will become darker or lighter; that is, the wearer is at the mercy of the photochromic properties of the lens material and cannot provide any type of adjustment him/herself.

There are various arrangements in the prior art directed to providing adjustment of eyewear tint that address the concerns associated with using lenses that automatically (via a chemical process) change tint. One exemplary adjusting arrangement is disclosed in U.S. Pat. No. 5,320,552, issued to P. Baran et al. on May 11, 1993. The Baran et al. configuration, described as a pair of "variable density sunglasses", uses two separate elements of polarized material to form each lens. The two separate elements are positioned in an overlapping arrangement, defined as an "inner" polarized element and an "outer" polarized element. The inner polarized elements for each lens are permanently attached to the frame. The outer polarized elements are positioned in a channel in the frame and held in a "rotatable" configuration such that the outer polarized elements are capable of rotating with respect to the inner polarized elements, where the angular separation between the polarization orientations of the pair of elements will dictate the degree of tint that is achieved.

In the Baran et al. arrangement, the rotation of the outer polarized elements is controlled by the manipulation of a gear wheel by the wearer. The outer elements are formed to include gear teeth around their periphery, where these teeth will mesh with the gear wheel when the various piece parts are combined. While somewhat of an improvement, the need to include teeth around the periphery of the lens elements is a time-consuming (and thus expensive) proposition. Moreover, the manipulation of the gear wheel itself may be difficult, and its position on the nose piece of the frame may be unacceptable and unnecessarily limit the types of frames within which these adjustable tint lenses may be used.

Thus, a need remains in the art for eyewear that may include an adjustable tint, where the adjustment is provided simply and easily by the wearer, without the need to incorporate difficult components and piece parts into the structure of the frame.

SUMMARY OF THE INVENTION

The needs remaining in the prior art are addressed by the present invention, which relates to adjustable tint eyewear and, more particularly, to eyewear having a tint that is easily adjustable by the wearer as necessary, for convenience and/or comfort.

In accordance with the present invention, eyewear is configured to use pairs of polarized lenses, with one pair (oriented to exhibit the same polarization direction) held stationary within the frame, and the remaining pair disposed adjacent with the fixed pair and permitted to rotate under the control of the wearer. Thus, the inventive eyeglasses utilize pairs of polarized elements in the same manner as Baran et al. However, in accordance with the present invention a novel mechanism is provided for the wearer to use in rotating the movable lenses with respect to the fixed lenses. This novel mechanism eliminates the need for modifications to the lenses themselves, as required in Baran et al. to provide movement. The novel mechanism allows for the hand control element to be positioned at virtually any location on the eyewear frame, allowing for the inventive adjustable tint eyewear to be used with any desired frame configuration.

In particular, the novel mechanism of the present invention consists of a single flexible member that is disposed to surround a peripheral portion of both of the movable, polarized lenses. The flexible member includes a U-shaped inner channel for holding these peripheral regions of the rotatable lenses secured in place. The flexible member itself is positioned to ride within a channel formed in the eyewear frame, and includes a hand control element (located in a position preferred by a wearer). By moving the hand control element, the wearer causes the flexible member to move back and forth, changing the orientation of the rotatable lenses with respect to the fixed lenses. Thus, an individual can quickly and easily move the hand control element back and forth until the desired degree of tint is obtained. Obviously, the wearer can easily re-adjust the tint level as needed by moving the hand control element. The hand control element may take the form of a small lever, a textured surface area along the flexible member, or any other suitable type of mechanism that is integral with the flexible member and is easily manipulated by the wearer to provide the desired amount of tint.

In one embodiment, the flexible member rides within a channel formed in a horizontal frame member component of conventional eyewear frames. In frame styles that do not include such a horizontal frame member, the flexible member can be disposed to surround the pair of rotatable polarized lenses in a type of "figure 8" pattern across the nose piece. Other configurations for supporting the positioning of the flexible member around the rotatable lenses may be used and are considered to fall within the spirit and scope of the present invention. In any case, the utilization of a single flexible member to provide the simultaneous rotation of both movable lenses, in accordance with the present invention, ensures that the same amount of darkening or lightening is provided for each eye.

An exemplary embodiment of the present invention takes the form of Eyewear exhibiting wearer-adjustable tint, comprising the following components: (1) a first pair of polarized lenses (oriented in a same polarization direction) fixed within an eyewear frame; (2) a second pair polarized lenses (also oriented in the same polarization direction), disposed adjacent to the first pair of polarized lenses in a one-to-one relationship and configured to be rotatable while the first pair of polarized lenses remains fixed; (3) a flexible member disposed to surround a portion of a periphery of each lens forming the second pair of lenses; and (4) a hand control element coupled to the flexible member for providing a linear movement of the flexible member, which generates a rotational movement of the second pair of polarized lenses so as to adjust the polarization orientation of the second pair of polarized lenses with the first pair of polarized lenses and adjust the tint of the eyewear as a function of the movement of the hand control element.

Other and further aspects of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
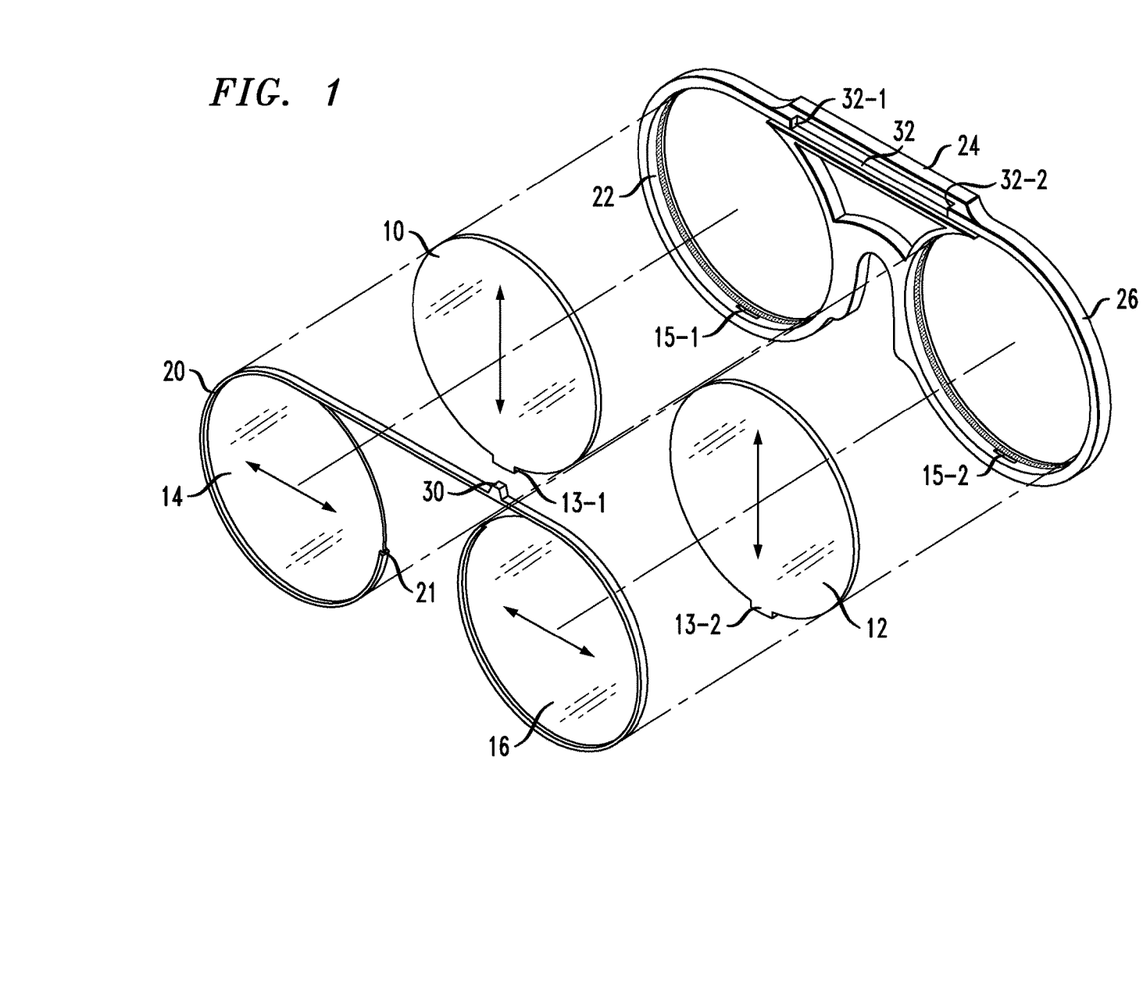
FIG. 1 is an exploded view of the various components forming the adjustable tint eyewear of the present invention.

FIG. 1 is an exploded view of the components that create adjustable tint eyewear in accordance with the present invention. In particular, FIG. 1 shows a pair of polarized lenses 10, 12 (hereinafter referred to as "fixed lenses") that are permanently attached to a front frame element 26. For the sake of discussion, lenses 10 and 12 are illustrated as oriented such that their polarization state (which is controlled to be the same) is in the vertical direction (indicated by the double-ended arrows in the drawing). In a preferred embodiment of the present invention, lenses 10 and 12 are formed to include a keying structure in the form of a tab 13, shown as tabs 13-1 and 13-2. With reference to FIG. 1, it is clear that tabs 13-1 and 13-2 fit in place in associated openings 15-1 and 15-2 formed in front frame element 26. By virtue of using these tabs, the prior vertical alignment of the polarization orientation of lenses 10 and 12 is ensured. However, it is to be understood that there may be other keying configurations used to provide the necessary orientation of lenses 10, 12 within front frame element 26.

Also shown in FIG. 1 is a pair of rotatable polarized lenses 14 and 16, hereinafter referred to as "rotatable lenses". In the particular embodiment as shown in FIG. 1, rotatable lenses 14, 16 are disposed behind fixed lenses 10, 12 (with respect to front frame element 26), with polarized rotatable lens 14 disposed behind (and aligned with) polarized fixed lens 10, and polarized rotatable lens 16 disposed behind (and aligned with) polarized fixed lens 12. In this particular embodiment, lenses 14 and 16 are shown as oriented such that their lines of polarization are horizontal (again, both lenses are oriented in the same direction), as indicated by the double-ended arrows in the drawing. In this situation with orthogonal (i.e., perpendicular) polarization states between the fixed lenses and rotatable lenses, maximum darkening (tinting) is achieved.

It is to be understood that the principles of the present invention equally apply to a configuration where the rotatable lenses are positioned in front of the fixed lenses (i.e., the rotatable lenses positioned between the fixed lenses and the front frame element). As long as a rotatable lens is positioned adjacent to (and properly oriented with) a fixed lens, the principles of wearer-adjustable tint in accordance with the present invention apply.

Figure 2:
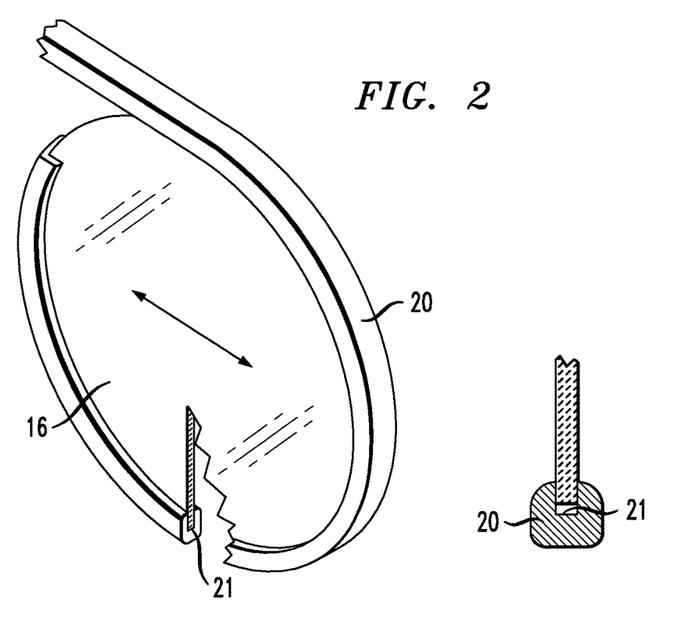
FIG. 2 is a cut-away view of a portion of the adjustable tint eyewear, showing the U-shaped channel within the flexible member and the position of a rotatable lens within this U-shaped channel.

Also shown in FIG. 1 is a flexible member 20, which is disposed to surround the outer periphery of at least a portion of each polarized rotatable lens 14 and 16. Flexible member 20 may comprise any suitable pliable material that is relatively thin, so as to easily surround the thickness of common lens structures (e.g., a monofilament fiber such as nylon, rubber, elastic, etc.). Flexible member 20 is configured to include an inner channel 21, as best shown in the cut-away view of FIG. 2 (showing a portion of flexible member 20 surrounding rotatable lens 16). By virtue of using this inner channel 21 to secure the positioning of lenses 14,16, the peripheral regions of each rotatable lens 14, 16 is held snugly in place within flexible member 20.

Figure 3:
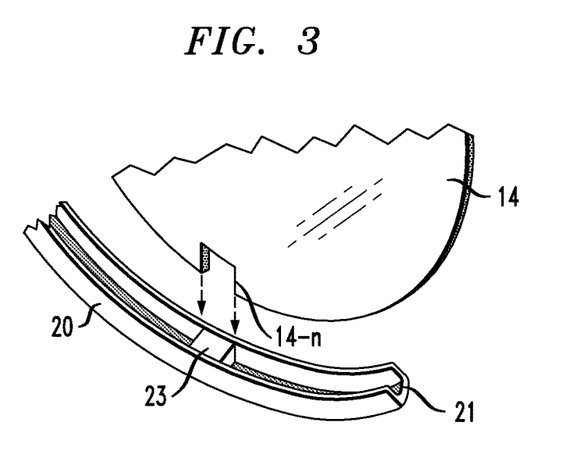
FIG. 3 is a cut-away view of another portion of the adjustable tint eyewear, showing a keying arrangement that may be used to properly position (and align) the rotatable lenses with respect to the flexible member.

In order to provide the proper initial orientation of lenses 14,16 with respect to lenses 10, 12, a preferred embodiment of the present invention includes a keying structure within flexible member 20, and a like keying structure within each rotatable lens 14, 16 so that lenses 14, 16 are locked into a desired initial position. FIG. 3 illustrates a portion of flexible member including a keying structure 23 within channel 21. Lens 14 is shown as including a notch 14-$n$ at a predetermined location. Thus, when positioning flexible member 20 around lens 14, notch 14-$n$ mates with keying structure 23 such that lens 14 is properly positioned with respect to flexible member 20. A similar keying structure is used to properly align and position lens 16 within flexible member 20. Thus, when combined with fixed lenses 10, 12, the orientation of the polarization for lenses 14,16 is known and defined with respect to the polarization orientation of the fixed lenses.

Referring back now to the structure of FIG. 1, the hand control element that is used by the wearer to rotate lenses 14, 16 with respect to fixed lenses 10, 12 is shown as taking the form of a lever control 30. In accordance with this specific embodiment of the present invention, lever control 30 is attached to flexible member 20, where as described in detail below, the wearer moves lever control 30 back and forth to rotate attached lenses 14, 16 and thus control the amount of tinting that is created.

Figure 4:
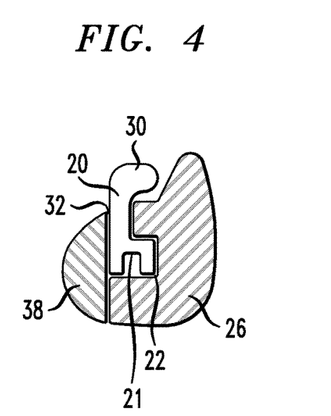
FIG. 4 is a cut-away side view of a portion of the horizontal frame member, illustrating the positioning of the flexible member within a slot formed in the frame.
Figure 5:
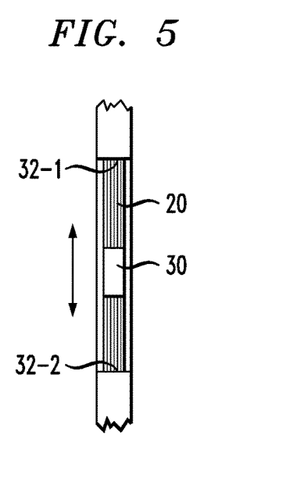
FIG. 5 is a top view of the illustration of FIG. 4.

In the embodiment as shown in FIG. 1, flexible member 20 is disposed to fit in a frame channel 22 formed within frame element 26, which in this view includes a horizontal frame member 24. In cases where fixed lenses 10, 12 are disposed in front of rotatable lenses 14, 16, frame channel 22 is located behind fixed lenses 10, 12. Conversely, in configurations where rotatable lenses 14, 16 are positioned in front of fixed lenses 10, 12, frame channel 22 will be formed in front of fixed lenses 10, 12. Once all components are in place, lever control 30 extends outward through a longitudinal opening (slot) 32 formed in horizontal frame member 24. FIG. 4 is a cut-away view illustrating the relative placement of flexible member 20, frame channel 22, lever control 30, slot 32 and horizontal frame member 24. Also shown in this view is a portion of a rear frame element 38 that is positioned between rotatable lenses 14, 16 and mates with front frame element 26 to form the complete eyewear assembly. FIG. 5 is a top view of a portion of horizontal frame member 24, showing the position of lever control 30 within slot 32.

Figure 6:
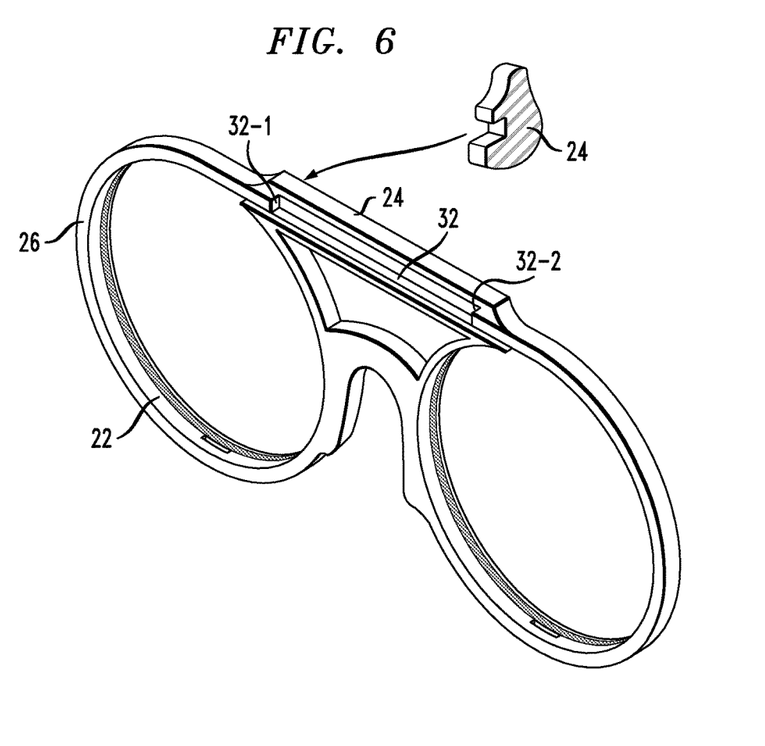
FIG. 6 is an isometric view of a front frame element, particularly illustrating the location of the slot used to control the range of motion of the flexible member.

In operation of this particular embodiment, the wearer moves lever control 30 along slot 32 (indicated by the double-ended arrows in FIG. 5) to perform the tint adjustment of the eyewear. Advantageously, the length of slot 32 is used to control the range of motion of lever control 30, functioning as a "stop" so that over-rotation of rotatable lenses 14, 16 does not occur. FIG. 6 is an isometric view of front frame element 26, horizontal frame member 24 and slot 32. As shown, slot 32 includes opposing end terminations 32-1 and 32-2 that function as the stops to prevent further movement of lever 30. It is to be understood that the precise location of lever control 30 and slot 32 are design details and do not impact the performance the adjustable tinting feature of the inventive eyewear.

Figure 7:
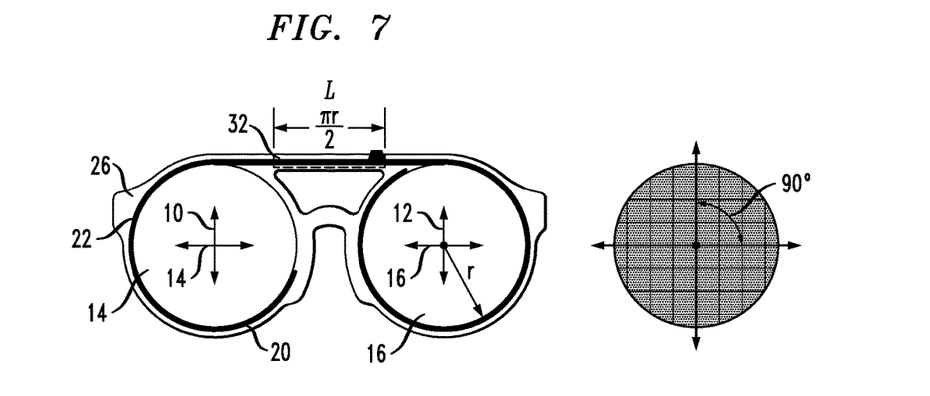
FIG. 7 is a rear view of the inventive adjustable tint eyewear as shown in FIG. 1.

FIG. 7 is a rear view of the inventive adjustable eyewear as shown in FIG. 1, with fixed lenses 10, 12 permanently attached to eyewear frame 26, and flexible member 20 disposed within channel 22 of frame 26. By virtue of the attachment of polarized lenses 14, 16 to flexible member 20, these lenses rotate as flexible member 20 is moved under the wearer's control. Evident in this view is the disposition of flexible member 20 with respect to lenses 14 and 16. As discussed above, it is important that polarized lenses 14, 16 are able to rotate through a full 90° arc with respect to fixed lenses 10, 12, in order to adjust between full tint and minimal tint. To this end, slot 32 is formed to have a length L of $\pi r/2$, where "r" is the radius of the lenses. With this relationship between the slot length and the lens radius, the full 90° rotation of lenses 14,16 is provided. In the view as shown in FIG. 7, the pairs of lenses are disposed perpendicular to each other (indicated by the 90° orientation shown in the side drawing), thus providing the maximum degree of tint.

In accordance with the present invention, a wearer easily adjusts the amount of tinting by moving lever control 30 along slot 32. Since lever control 30 is attached to flexible member 20, the movement of lever control 30 will result in flexible member 20 moving as well. The movement of flexible member 20 functions to rotate lenses 14 and 16—always by the same amount and in the same direction—and thus adjusts the polarization orientation of rotatable lenses 14, 16 with respect to fixed lenses 10, 12. In the initial position shown in FIG. 7, the polarization of rotatable lenses 14, 16 is oriented at 90° with the polarization of fixed lenses 10, 12. This position provides for maximum tint, as indicated by the side drawing shown perpendicular polarization lines and a relatively dark tint.

Figure 8:
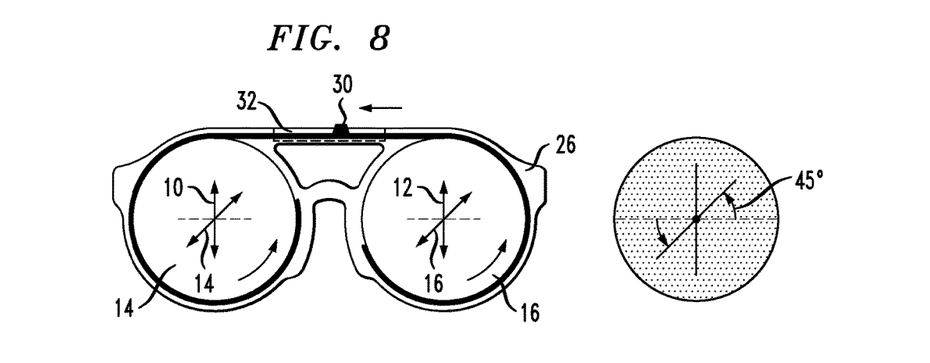
FIG. 8 illustrates one specific positioning of the flexible component, used to rotate the inner lenses and provide a first specific degree of tint.
Figure 9:
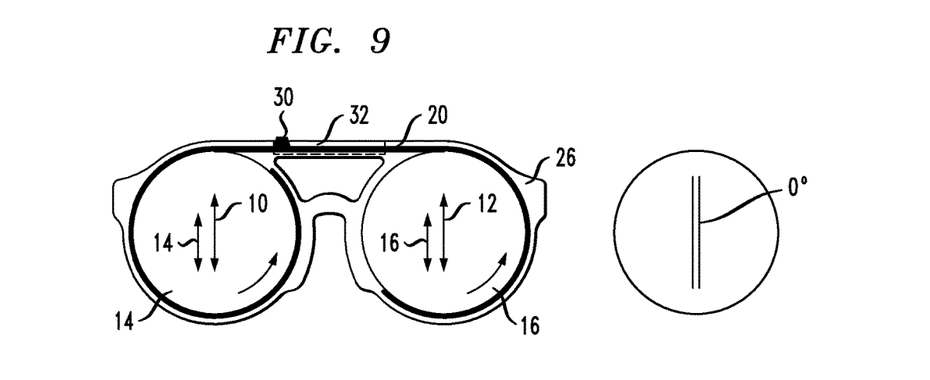
FIG. 9 illustrates another specific positioning of the flexible component, in this case where the inner lenses are further rotated such that the polarizations of the pairs of lenses are essentially parallel, thus providing a minimal degree of tint.

FIGS. 8 and 9 illustrate the possible adjustments in tinting that is achieved by using lever control 30 to move flexible member 20 and rotate lenses 14, 16. In the configuration as shown in FIG. 8, lever control 30 has moved to the midpoint of slot 32 (i.e., a shift of length $\pi r/4$). This movement causes a like movement of flexible member 20, rotating polarized lenses 14, 16 through an angle of about 45°, as shown. In this case, lever control 30 has been moved to the left (as shown by the arrow), so that lenses 14, 16 rotate counterclockwise. The side drawing in FIG. 8 shows that the polarization of lenses 14, 16 has now rotated with respect to the fixed 'vertical' polarization lines of lenses 10, 12. In this state, the tint has now somewhat lightened.

FIG. 9 illustrates the adjustable eyewear of the present invention in the configuration where lever 30 has been moved to the opposing end (stop 32-1) of slot 32. This movement results in an additional rotation of 45° for lenses 14, 16 and results in an arrangement where the polarization orientation of the lenses is parallel. When the polarized lenses are oriented in this position, minimal blocking of sun rays is obtained, thus the lightest amount of tinting (if any) is created. The side drawing in FIG. 9 depicts the lenses in this state.

Figure 10:
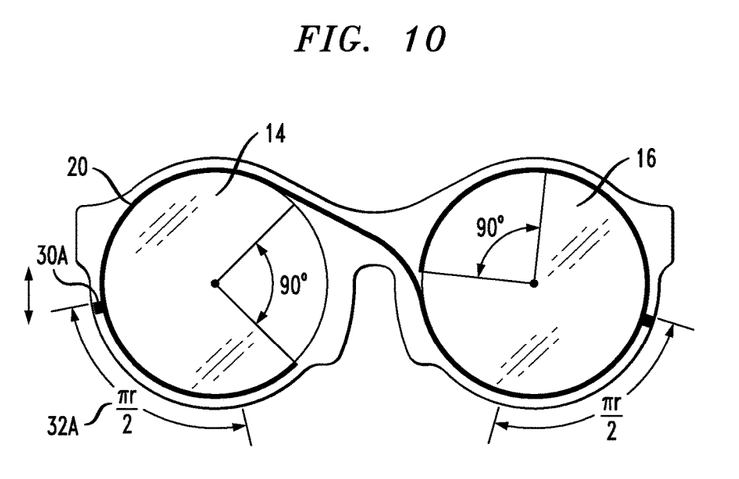
FIG. 10 is a cut-away diagrammatic view of another embodiment of the present invention, in this case where the flexible member is disposed in a "figure-8" pattern to surround the lenses in a manner where the rotatable lenses simultaneously rotate with respect to the fixed lenses.

As mentioned above, it is possible to use a "figure-8" type of placement of flexible member 20 around rotatable lenses 14, 16. This type of placement is particularly useful for frames that do not include a horizontal frame member. FIG. 10 illustrates an alternative embodiment of the present invention where flexible member 20 is disposed in such a figure-8 type of pattern around lenses 14, 16. As with the configurations discussed above, flexible member 20 is positioned to surround a portion of the outer periphery of lens 14.

In this figure-8 configuration, however, flexible member 20 is disposed to then surround a portion of the inner periphery of lens 16. The "figure-8" threading of flexible member 20 may be disposed in the opposite direction, with flexible member 20 surrounding a portion of the outer periphery of lens 16 and a portion of the inner periphery of lens 14.

Figure 11:
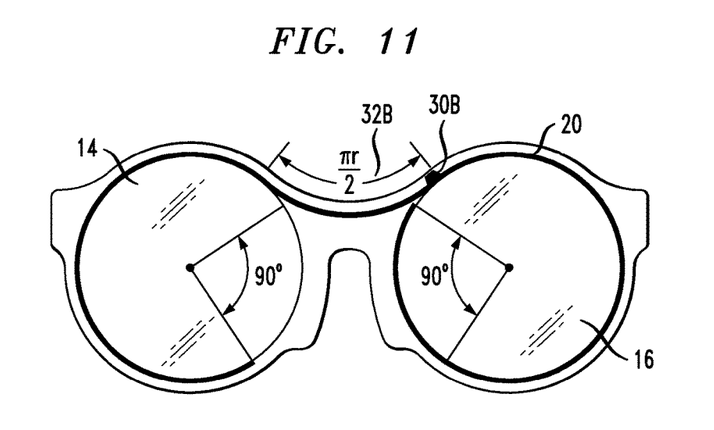
FIG. 11 is a cut-away view of yet another embodiment of the present invention, in this case positioning the flexible member in a different configuration within the same eyeglass frame as shown in FIG. 10.

Regardless of the direction used to dispose flexible member 20 in a figure-8 configuration, a lever control 30A is disposed along the side of the frame as shown in FIG. 10 and attached to flexible member 20 in the same manner as above. Thus, an "up" and "down" movement of lever control 30A with a slot 32A formed in the eyewear frame and used to move flexible member 20 and rotate polarized lenses 14, 16. FIG. 11 illustrates an alternative placement of flexible member 20 within the same frame design as shown in FIG. 10. In this configuration, a lever control 30B is located in an upper area of the eyewear, with associated slot 32B extending across the nose piece of front frame element 26. It is clear that various other placements of flexible member 20 with respect to rotatable lenses 14, 16 are possible. All are considered to fall within the scope of the present invention.

Figure 12:
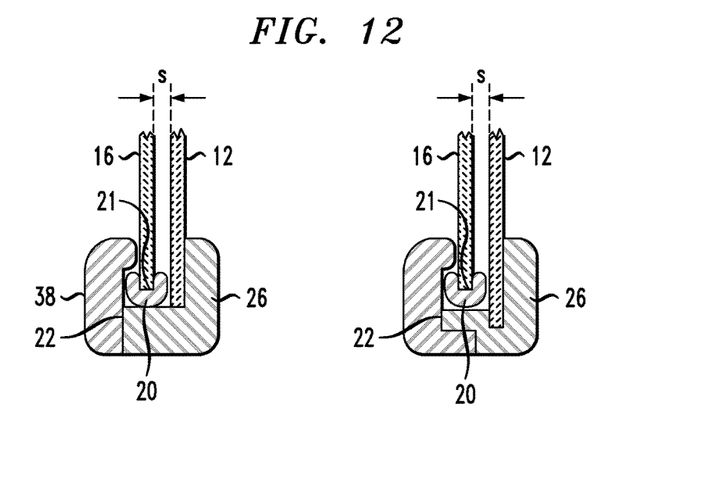
FIG. 12 is a cut-away view of a portion of the inventive eyewear, in this case illustrating the spacing that is maintained between the fixed lenses and the rotatable lenses.

Advantageously, flexible member 20 provides and maintains a slight separation s between the fixed lenses 10, 12 and rotatable lenses 14, 16. This slight separation, or gap, prevents scratches from occurring as lenses 14, 16 rotate with respect to fixed lenses 10, 12. FIG. 12 is a cut-away view of two alternative configurations of the elements, in each case depicting the spacing s created by holding rotatable lens 16 within the U-shaped channel 21 of flexible member 20.

Figure 13:
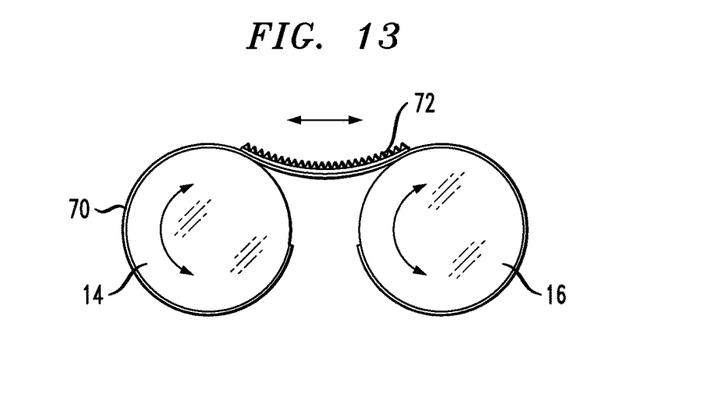
FIG. 13 illustrates an alternative embodiment of the present invention, in this case utilizing a textured surface area along the flexible member as the hand control element.

As mentioned above, there are a variety of other types of hand control elements that may be used by the wearer to move the flexible element (and thus rotate lenses 14, 16 with respect to fixed lenses 10, 12). FIG. 13 illustrates a flexible member 70, also formed in accordance with the present invention, where flexible member 70 is shown as including a textured surface portion 72 that is used by the wearer to move flexible member 70 back and forth and adjust the amount of tint. The view of FIG. 13 shows rotatable lenses 14, 16 as surrounded by flexible member 70. As with the embodiments described above, flexible member 70 includes a channel (not shown) within which the outer peripheries (or the combination of inner and outer peripheries for the figure-8 disposition of the flexible member) of lenses 14, 16 are held. A keying arrangement (such as a keying structure and notch) is used as before to properly align lenses 14, 16 within flexible member 70.

Figure 14:
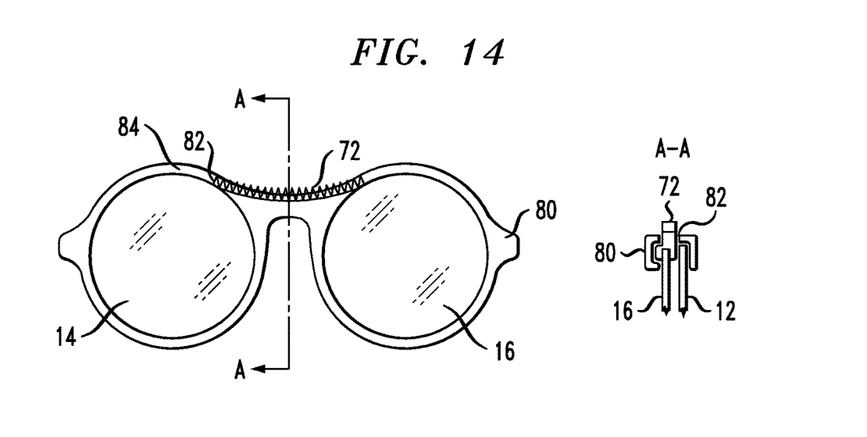
FIG. 14 shows the configuration of FIG. 13 as positioned within an exemplary eyewear frame.

FIG. 14 illustrates an exemplary eyewear frame 80 with the combination of flexible member 70 and lenses 14, 16 in place. It is to be understood that fixed lenses 10, 12 are also positioned (and properly oriented) with respect to rotatable lenses 14, 16. Evident in this view is the positioning of textured surface 72, as extending through a slot 82 formed in a horizontal frame member 84 of eyewear frame 80 (see cut-away view along line A-A). In accordance with the present invention, a wearer may simply adjust the amount of tint by touching textured surface 72, and moving this portion of flexible member 70 back and forth within slot 82. The linear movement of flexible member 70 causes the rotational movement of lenses 14, 16 and adjusts the polarization between the pairs of lenses accordingly, thereby allowing the wearer to control the amount of tint by himself.

Figure 15:
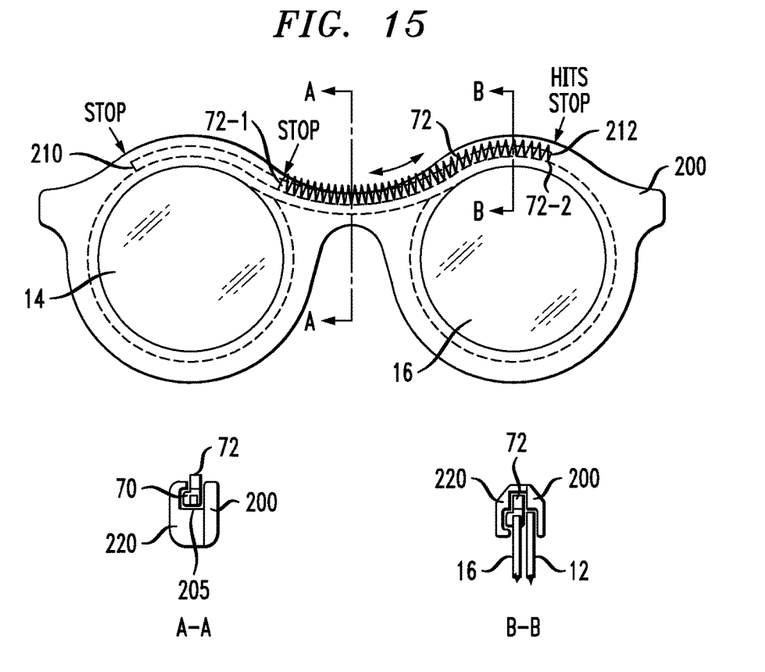
FIG. 15 is another view of the configuration of FIG. 13, in this view showing the internal stop features formed within the frame to prevent over-rotation of the lenses.

FIG. 15 is another view of the embodiment of FIGS. 13 and 14, in this view showing the internal "stop" mechanisms controlling the movement of the flexible member. As mentioned above, these stops are hidden within the eyewear frame (as opposed to being an exposed slot, as described above). The eyewear frame in this case can be configured in somewhat of a clamshell form that encloses the flexible member while allowing for the hand control element to remain accessible for the wearer. As shown, textured surface 72 is formed to extend somewhat above the lower profile of the remainder of flexible member 70, where this extension of surface area 72 is used to limit the amount of lateral movement possible with flexible member 70.

As shown, eyewear frame 200 is formed to include embedded stops 210 and 212 for preventing the end terminations of textured area 72 (shown as ends 72-1 and 72-2) from over-rotating lenses 14, 16. The cut-away side view of a central area of the eyewear frame, taken along line A-A shows flexible member 70 located within a channel 205 formed within the eyewear between a back eyewear frame piece 200 and a front eyewear frame piece 220 (thus forming a "clamshell" type of enclosure for capturing and retaining flexible member 70 within the frame structure. As shown, textured surface area 72 extends above front frame piece 205, allowing for the user to adjust the tint by rotating the lenses. Another cut-away view, taken along line B-B shows how flexible member 70 remains hidden within the combination of frame pieces 200 and 220 in all areas of the eyewear that are not contacted by the wearer.

Figure 16:
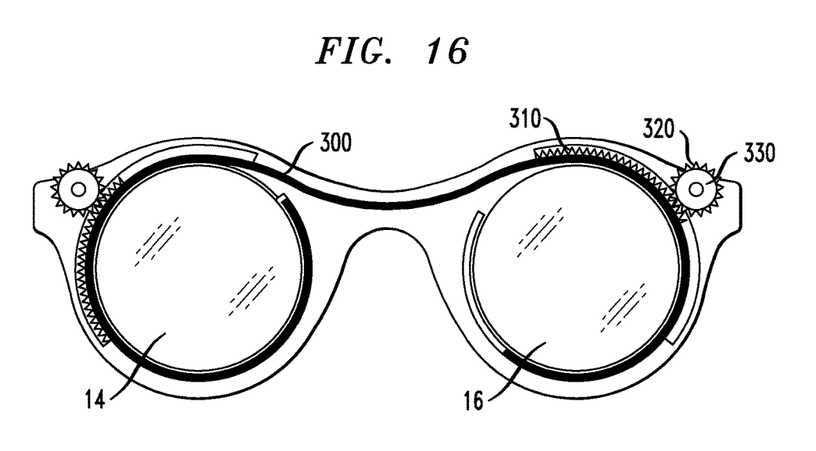
FIG. 16 illustrates yet another embodiment of the present invention, in this case utilizing a small thumbwheel that works in conjunction with a serrated surface area on the flexible member to provide movement of the flexible member and control of the degree of tint obtained for the eyewear.

FIG. 16 shows yet another type of hand control element. In particular, a flexible member 300 is positioned to surround (and be aligned with) rotatable polarized lenses 14,16 in the manner discussed above. In this particular embodiment, flexible member 300 is formed to include at least one surface area where a set of teeth 310 is formed across the outer surface. This set of teeth 310 is used to mesh with teeth 320 of a thumbwheel 330, as shown. In order to adjust the tint of the eyeglasses, the wearer simply rotates thumbwheel 330 to cause movement of flexible member 300 and rotation of lenses 14, 16. In the exemplary embodiment shown in FIG. 16, a pair of such controls is included, one located near an upper side of each lens 14 and 16. Obviously, the thumbwheel mechanism can be located at any point along the frame where it is most appropriate.

Various other features of the frame and hand control elements, as well as positioning of the flexible member, may be modified as a function of a particular frame design and are considered to fall within the scope of the present invention. While the provisioning of adjustable tint in this manner obvious requires the use of circular inner lenses (in order to provide proper rotation), the outer lenses may exhibit an suitable geometry, as long as the outer lenses are polarized and can be fixed in place to provide adjustable tint in conjunction with the rotatable inner lenses. Moreover, various ornamental features may be added to the frame structure to change the physical appearance of the lenses.

What is claimed is:

1. Eyewear exhibiting wearer-adjustable tint, comprising:
    a first pair of polarized lenses, oriented in a same polarization direction and held in a fixed position within an eyewear frame;
    a second pair polarized lenses, oriented in the same polarization direction and disposed adjacent to the first pair of polarized lenses in a one-to-one relationship and configured to be rotatable while the first pair of polarized lenses remains fixed;
    a flexible member disposed to surround a portion of a periphery of each lens forming the second pair of lenses, including an inner channel formed along the length of the flexible member such that a portion of a periphery of each lens forming the second pair of polarized lenses is disposed within the inner channel of the flexible member; and a hand control element coupled to the flexible member for providing a linear movement of the flexible member, which generates a rotational movement of the second pair of polarized lenses so as to adjust the polarization orientation of the second pair of polarized lenses with the first pair of polarized lenses and adjust the tint of the eyewear as a function of the movement of the hand control element.

2. Eyewear as defined in claim 1 wherein
the second pair of polarized lenses is positioned behind the first pair of polarized lenses.

3. Eyewear as defined in claim 1 wherein
the second pair of polarized lenses is positioned in front of the first pair of polarized lenses.

4. Eyewear as defined in claim 1 wherein the flexible member comprises a monofilament fiber.

5. Eyewear as defined in claim 4 wherein the flexible member comprises a material selected from the group consisting of: nylon, elastic and rubber.

6. Eyewear as defined in claim 1 wherein the flexible member includes a pair of key structures and each lens forming the second pair of polarized lenses includes a key structure, such that as the second pair of polarized lenses are disposed within the inner channel of the flexible member, the key structures of the second pair of polarized lenses align with the key structures of the flexible member to ensure proper polarization orientation of each lens of the second pair of lenses.

7. Eyewear as defined in claim 1 wherein the eyewear further comprises a frame member for supporting the combination of the first pair of polarized lenses, the second pair of polarized lenses and the flexible member, the frame member holding the first pair of polarized lenses in a fixed position and including a channel within which the flexible member moves back and forth, allowing for the second pair of polarized lenses to rotate with respect to the first pair of polarized lenses.

8. Eyewear as defined in claim 7 wherein the frame member includes a slot positioned such that the hand control element protrudes through the slot, so that a wearer is capable of moving the hand control element back and forth along the slot and adjust the tint of the eyewear by virtue of the movement of the flexible member and the rotation of the second pair of polarized lenses.

9. Eyewear as defined in claim 8 wherein the lenses are defined as having a radius of r and the slot formed in the frame member is configured to have a length of about $\pi r/2$, creating stops at either end of the slot and preventing over-rotation of the second pair of polarized lenses.

10. Eyewear as defined in claim 7 wherein the frame member includes a plurality of internal stop tabs, disposed at predetermined locations along the channel so as to prevent extended movement of the flexible member and over-rotation of the second pair of polarized lenses.

11. Eyewear as defined in claim 1 wherein the hand control element comprises a lever control coupled to the flexible member.

12. Eyewear as defined in claim 1 wherein the hand control element comprises a textured surface region formed along a predetermined outer surface area of the flexible member.

13. Eyewear as defined in claim 1 wherein the hand control element comprises at least one thumbwheel, and the flexible member includes an outer surface region formed to include engaging teeth, with the thumbwheel disposed to mesh with the engaging teeth, wherein by rotating the thumbwheel the wearer provides lateral movement to the flexible member.

14. Eyewear as defined in claim 1 wherein the flexible member is disposed to encircle an outer peripheral portion of each lens forming the second pair of polarized lenses.

15. Eyewear as defined in claim 1 wherein the flexible member is disposed to encircle an outer peripheral portion of one lens forming the second pair of polarized lenses, and an inner peripheral portion of the remaining lens forming the second pair of polarized lenses, creating a figure-8 disposition of the flexible member around the lenses forming the second pair of polarized lenses.

16. Eyewear as defined in claim 1 wherein each lens of the first pair of polarized elements includes a keying structure used to ensure proper polarization orientation of the first pair of lenses when inserted in an eyewear frame.

17. Eyewear as defined in claim 1 wherein the portion of the flexible member outside the inner channel forms a spacing between the first pair of polarized lenses and the second pair of polarized lenses.

* * * * *